United States Patent [19]

Kaethler

[11] Patent Number: 5,553,215
[45] Date of Patent: Sep. 3, 1996

[54] METHOD AND SYSTEM OF SHARING COMMON FORMULAS IN A SPREADSHEET PROGRAM AND OF ADJUSTING THE SAME TO CONFORM WITH EDITING OPERATIONS

[75] Inventor: Richard L. Kaethler, Belleuve, Wash.

[73] Assignee: Microsoft Corporation, Redmond, Wash.

[21] Appl. No.: 310,248

[22] Filed: Sep. 21, 1994

[51] Int. Cl.[6] .................................................. G06F 17/00
[52] U.S. Cl. .......................... 395/144; 395/145; 395/148
[58] Field of Search .................................. 395/144, 133, 395/139, 145–149, 155–161

[56] References Cited

U.S. PATENT DOCUMENTS 5,416,895 5/1995 Anderson et al. ...................... 395/148

OTHER PUBLICATIONS

1985 Microsoft Multiplan Reference Manual, Chapter 8, (Elements of Multiplan), Transforming the Worksheet, pp. 183–184.

*Primary Examiner*—Almis R. Jankus
*Attorney, Agent, or Firm*—Jones & Askew

[57] ABSTRACT

A method and system of adjusting shared formulas in a spreadsheet program in response to editing operations. Upon an editing operation, the boundary line of cells that are shifted is determined with respect to the location of cells sharing a common formula and to the location of the cell references therein. On the bases of the relative location of the boundary line, the present invention adjusts the shared formulas. Furthermore, a method and system is provided for partitioning large cell groups having common formulas into smaller areas of common formulas and sharing a separate shared formula for each smaller area in order to allow efficient adjustments of shared formulas in response to editing operations.

21 Claims, 8 Drawing Sheets

|   | A | B | C | D | E | F | G | H | I |
|---|---|---|---|---|---|---|---|---|---|
| 1 |   |   |   |   |   |   |   |   |   |
| 2 |   |   |   |   |   |   |   |   |   |
| 3 |   |   |   |   |   |   |   |   |   |
| 4 |   |   |   |   |   |   |   |   |   |
| 5 |   |   | NUMBER OF TEST | 2 |   |   |   |   |   |
| 6 |   |   | TEST 1 | TEST 2 |   |   | AVERAGE |   |   |
| 7 |   | STUDENT 1 | 100 | 90 |   |   | 95 |   |   |
| 8 |   | STUDENT 2 | 80 | 80 |   |   | 80 | 93 |   |
| 9 |   | STUDENT 3 | 70 | 80 |   |   | 75 |   |   |
| 10 |   |   |   |   |   |   |   |   |   |
| 11 |   |   |   |   |   |   |   |   |   |

METHOD AND SYSTEM OF SHARING COMMON FORMULAS IN A SPREADSHEET PROGRAM AND OF ADJUSTING THE SAME TO CONFORM WITH EDITING OPERATIONS

TECHNICAL FIELD

The present invention relates generally to spreadsheet systems for computing devices, and more particularly to an improved system for, and method of, sharing common formulas in a spreadsheet program and of adjusting the same to conform with editing operations.

BACKGROUND OF THE INVENTION

Spreadsheets perform a wide variety of tasks and have proliferated in businesses, homes, academia, and in a multitude of other environments. This proliferation has been due, in part, to the ability of spreadsheets to calculate new data from existing data.

A spreadsheet program may comprise one or more worksheets each of which is divided into a rectangular grid made up of columns and rows as shown in FIG. 1. A letter assigned to each column appears in the column header just above the worksheet grid. A number assigned to each row appears in the header to the left of the worksheet grid. A cell is formed at the intersection of each column and row.

The cells form the basic building blocks of the worksheet. Each cell is assigned a unique set of coordinates consisting of its column and row number, called a cell reference. A cell reference serves as a pointer to a particular cell. When a cell reference is called by another cell, the referenced cell returns its value to the calling cell. Thus, one cell is able to obtain and use the numeric value of another cell by simply referencing it.

Additionally, a cell may obtain and use the numeric values of a group of cells by referencing the area of the group. An area reference comprises two cell references, that of the top left cell in a group and that of the bottom right cell in the group. For the sake of convenience, the term cell reference will be used herein to refer to both references to a particular cell and to references to an area.

The value of a cell may be a number or text stored in the cell, or the value may be the solution to a formula that is stored in the cell. A formula is stored in a cell in a tokenized form. The formula consists of mathematical operations to be performed along with any cell references for values required for the mathematical operations. The worksheet automatically calculates solutions for the formula by retrieving values of the cell references in the formula and performing the mathematical operations defined by the formula.

A cell reference in a formula may be absolute or relative with respect to the location of the cell containing the formula. An absolute reference to a cell in a formula points to the absolute location of that cell on the worksheet and remains the same when the formula is copied to other cells. Absolute references are utilized when the value of a cell having a particular location is always intended for use in the formula regardless of the location of the cell containing the formula. Conversely, a relative reference to a cell points to the location of the cell in relation to the cell that contains the formula and necessarily changes when a formula is copied to other cells in order to preserve that relation. Relative references are utilized when the value of a cell, having a particular offset from the cell containing the formula rather than a particular location in the worksheet, is always intended for use in the formula.

Because a formula is stored separately in the worksheet from any values used in the formula's computations, the formula need not be modified when the value of a referenced cell is changed. Rather, the solution for the formula need only be recomputed. Because the worksheet recomputes the solution automatically, the value calculated by the formula of a worksheet, the new data, remains current even after the underlying values, the existing data, have been changed.

The separate storage of formulas in their entirety and values, however, requires a large amount of memory as compared to storing only the values of the solutions of the formulas. To reduce the amount of storage required by formulas, an attempt has been made in the prior art to store only one copy of formulas that are common to a continuous cell group and to share that formula among the cells of the cell group. As used herein, the phrase common formulas means formulas in a continuous cell group in which the mathematical operations and the absolute references are identical and in which the relative references have the same offset. Common formulas occur as a consequence of copying a formula to other cells and are frequently used to manipulate different series of the same data in the same manner.

A shared formula, as distinguished from a common formula, is stored in tokenized form. The shared formula consists of mathematical operations and the absolute cell references of the values required by the mathematical operations. The absolute cell references are identical for a common formula set. Because the relative cell references are different for each formula in a common formula set, however, relative cell references cannot be stored directly in the shared formula. Instead, the offsets of the relative cell references are stored in the shared formula. The offsets of the relative cell references are identical for a common formula set.

Each cell that shares a formula contains a pointer to that formula in order to link it with the formula. The formula is stored separately from the cell. Solutions to a shared formula are automatically calculated by the worksheet for each cell by applying the offsets to determine the relative cell references, retrieving the values of the cell references, both absolute and relative, and performing on them the mathematical operations defined by the shared formula.

The above described method of sharing formulas in the prior art was successful in reducing the amount of storage required by formulas. A problem, however, with formula sharing is that a shared formula could not be modified in response to editing operations, as is done for individual formulas residing in cells. As used herein the term editing operation means the insertion or deletion of rows or columns, which causes a shift in the existing cells of a worksheet and thus the cell references of the formulas therein. Thus, in shared formulas, cell references to values that were shifted by editing operations were not updated. As a result, the shared formulas were left outdated, which caused the values calculated by the shared formulas to be erroneous. Because that result was unacceptable, formula sharing was abandoned despite its benefit in reducing the amount of storage required by formulas.

Therefore, there exists a need in the art for a method and system of updating shared formulas in response to editing operations such that they remain current and yield correct solutions. Further, there exists a need in the art for an improved method and system of sharing formulas in a spreadsheet program such that they may be easily adjusted upon editing operations.

SUMMARY OF THE INVENTION

The present invention provides a better solution to solving the problems in the art described above by providing a method and system of adjusting shared formulas in a spreadsheet program in response to editing operations. Upon an editing operation, the boundary line of cells that are shifted is determined with respect to the location of cells sharing a common formula and with respect to the location of the cell references in the common formula. On the basis of the relative location of the boundary line, the method and system of the present invention adjust the shared formulas. Furthermore, the present invention provides an improved method and system of sharing common formulas in a spreadsheet program in order to allow efficient adjustments of shared formulas in response to editing operations. Large cell groups having common formulas are partitioned into smaller areas of common formulas. A separate shared formula is then shared for each smaller area of common formulas.

When called upon to share a common formula, the method and system of the present invention first determine whether a cell group should be partitioned on the basis of the number of columns and rows in an area that contains the cell group. If the number of columns is greater than a predetermined limit, the area of the cell group is partitioned into sub-areas each having a preset number of columns, except for a last sub-area which has the remainder of the columns of the area. Further, if the number of rows is also greater than a predetermined limit, the sub-areas are partitioned into formula boxes each having a preset number of rows, except for a last formula box of each sub-area which has the remainder of the rows of the sub-area. If the number of columns and rows are not above the predetermined limits, the entire area of the cell group forms a formula box. A shared formula is then determined and stored for each formula box.

Upon an editing operation causing a cell shift along an edit line, the method and system of the present invention determine a reference box for each shared formula. The reference box of a shared formula bounds an area of the worksheet that contains the cell references of the shared formula. The location of the formula box and the reference box on the worksheet is then determined with respect to the location of the edit line. On the basis of that determination, the absolute cell references and the offsets of the relative cell references of the shared formula are adjusted. If a cell in the formula box can no longer share the shared formula due to the location of the cell shift, that cell is unshared and individually adjusted.

Thus, it is an object of the present invention to provide an improved method and system for sharing formulas in a spreadsheet program such that they may be efficiently adjusted upon editing operations.

It is another object of the present invention to provide a method and system for updating shared formulas in response to editing operations such that they remain current and yield correct solutions.

Further objects, features and advantages of the present invention will become apparent upon reviewing the following description of the preferred embodiments of the invention, when taken in conjunction with the drawings and appended claims.

BRIEF DESCRIPTION OF THE DRAWINGS

Figure 1:
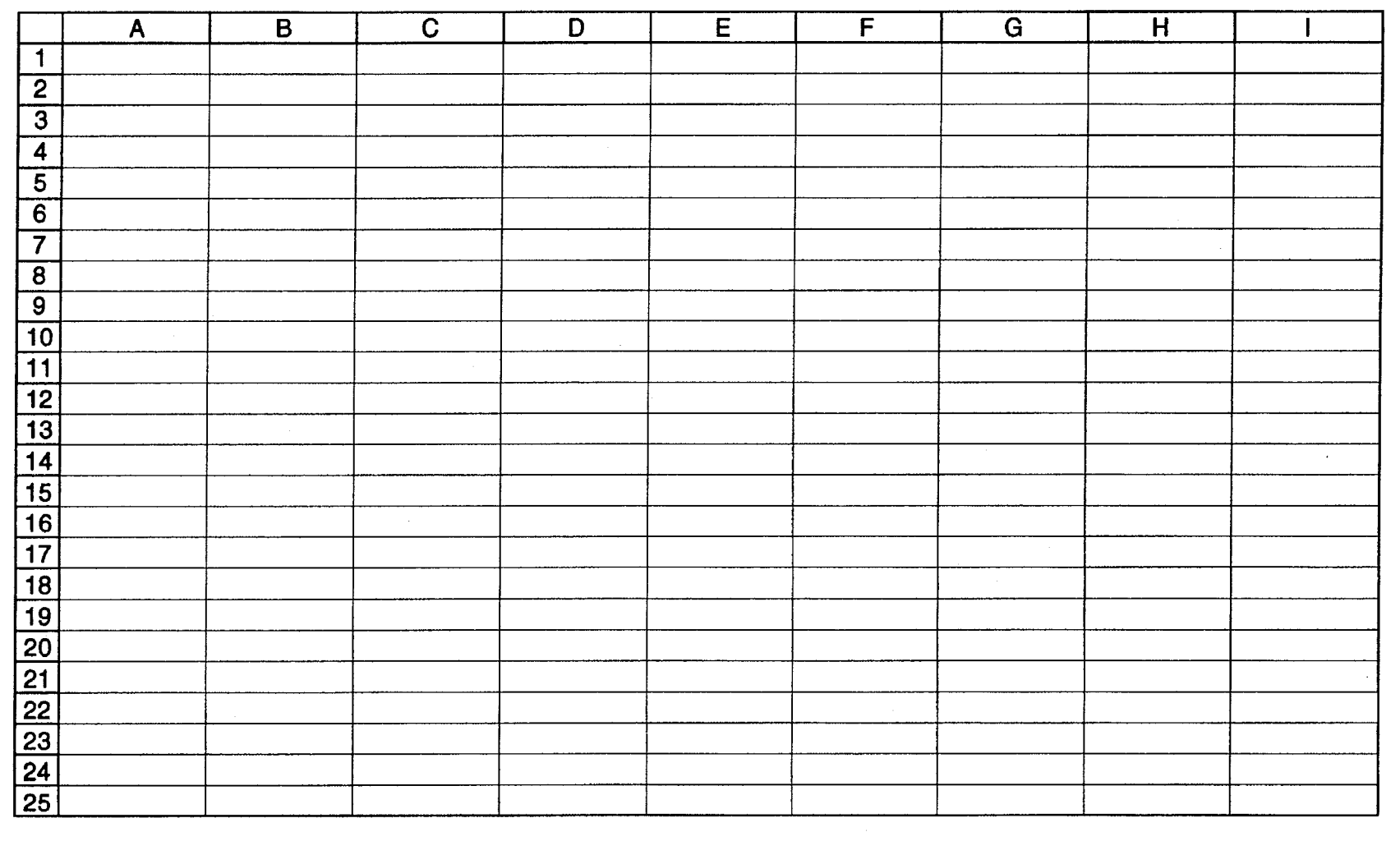

FIG. 1 is a worksheet of a spreadsheet program showing the rectangular grid of cells at the intersection of the columns and rows.

FIG. 5 is a representative example of formula utilization in the worksheet of FIG. 1, showing a formula box and a reference box for adjusting shared formulas in accordance with the present invention.

DETAILED DESCRIPTION

Figure 2:
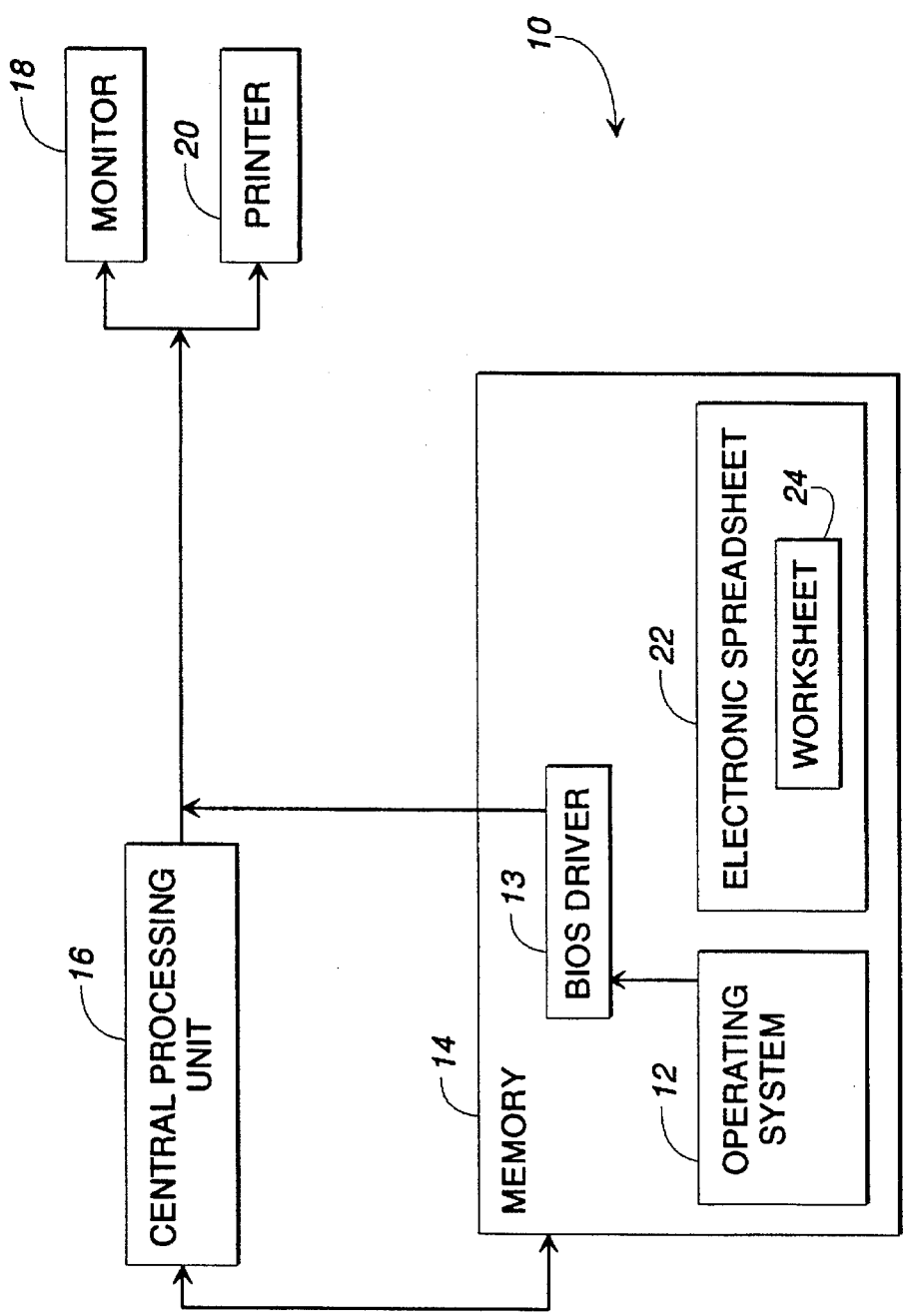
FIG. 2 is a diagrammatic view of the components of the computing system used in connection with the spreadsheet of FIG. 1 for sharing formulas in accordance with the present invention and adjusting the same in response to editing operations.

Referring now in more detail to the drawings, in which like numerals refer to like parts throughout the several views, FIG. 2 shows the components of the preferred operating environment, a computer system, for use in connection with a spreadsheet program for sharing formulas in accordance with the present invention and adjusting the same in response to editing operations.

As show in FIG. 2, a computer system 10 comprises an operating system 12 stored on a memory device 14. The operating system 12 operates the computer system 10 in conjunction with a central processing unit (CPU) 16 to retrieve, process, store and display data. Data may be displayed electronically on a monitor 18 or a hard copy may be generated by a printer 20 as a result of data sent from the operating system 12 to the basic input/output system (BIOS) driver 13.

A computer-implemented spreadsheet program or application program 22 is stored on the memory device 14. The spreadsheet program 22 is called by the operating system 12 upon a request by a user. Data is passed from the spreadsheet program to the CPU and the BIOS driver by the operating system 12. As previously discussed, the spreadsheet program 22 comprises one or more worksheets 24 that are divided into a rectangular grid made up of columns and rows. At the intersection of each column and row is a cell occupying that unique location on the worksheet 24. Each cell is assigned a unique set of coordinates consisting of its column and row number, called a cell reference. A cell reference serves as a pointer to a particular cell and, when the cell reference is called by another cell, the called cell returns its value. The value of a cell may be a number or text stored in the cell or may be the solution to a formula stored in the cell. A solution to the formula is automatically calculated by the worksheet by retrieving values of the cell references in a formula and performing the mathematical operations defined by the formula.

Figure 3:
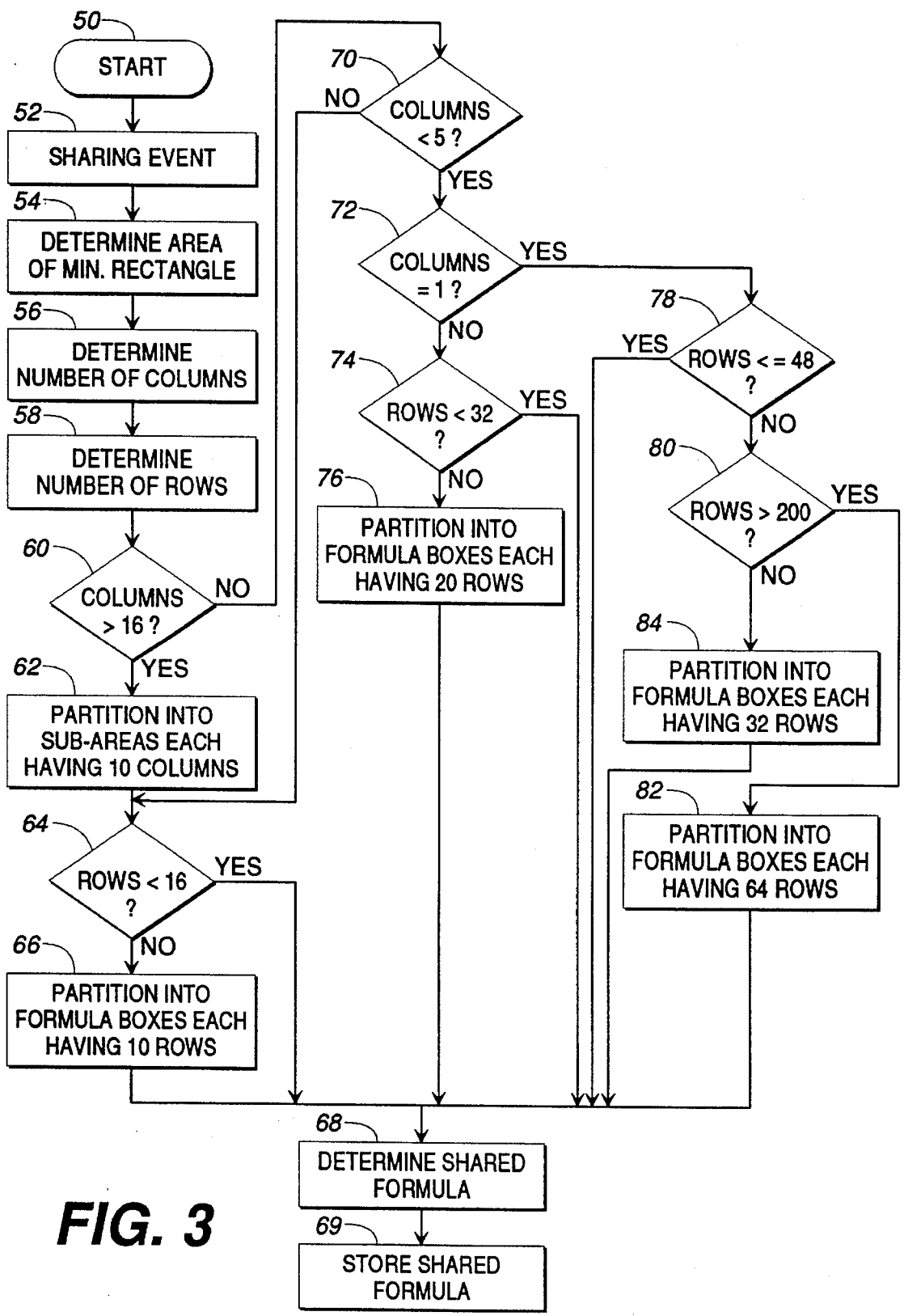
FIG. 3 is a logical flow diagram of the partitioning process for sharing formulas in accordance with the present invention.

As shown by FIG. 3, the method of the present invention for sharing common formulas in a worksheet 24 begins at step 50 and proceeds to step 52. At step 52, a sharing event occurs. In the preferred embodiment, the sharing events are the actions of copying, filling or command-entering formulas in the worksheet 24 and the operations of loading or storing the worksheet 24 to the memory device 14. The fill and command-enter actions are preferably included with the copy action as sharing events because, like copying, those actions always result in a group of common formulas that can be shared. Worksheet loading and storing operations are preferably included as sharing events because they are convenient times for the spreadsheet program 22 to search the worksheet 24 and share any common formulas that came about by means other than a copy, fill or command-enter action.

Proceeding to step 54, an area of a minimum rectangle that contains a cell group having common formulas is determined. For sharing events resulting from a copy, fill and command-enter actions, the minimum rectangle is the range of the area to which the formula is copied, filled or entered. For sharing events at loading and storage of the worksheet 24, the spreadsheet program 22 scans the worksheet 24 from left to right, top to bottom for adjacent cells having common formulas and then determines the minimum rectangle for that cell group.

Determining if two adjacent cells have common formulas is a two-step process. First, their mathematical operations and their absolute references are compared. If the mathematical operations and the absolute references are identical, then the offsets of the relative references are compared. The offsets of the relative references are determined by subtracting the cell reference of the cells containing the formulas from the relative reference. If the offsets are also identical, then the two cells share common formulas.

The minimum rectangle of the cell group having the common formula is determined by scanning the next cell in the row of the two cells and determining if it also has a common formula. If the next cell has a common formula, then the cell after it in the row is scanned, and so on, until a cell is found not having a common formula. Next, the cells in the succeeding rows are scanned until a row of cells not having a common formula is found. The top of the minimum rectangle is defined by the first row containing the common formulas. Similarly, the bottom of the minimum rectangle is defined by last row containing the common formulas. The sides of the minimum rectangle are defined by the first and last cells of each row containing the common formulas.

Proceeding to step 56, the number of columns bounded by the area is determined by subtracting the lowest numbered column of the minimum rectangle from the highest numbered column of the minimum rectangle and adding 1. It will be understood by those skilled in the art that each column has a number associated with its position on the worksheet. The associated numbers of the columns start with 1 for column A and sequentially increase for each column thereafter. Thus, column C has an associated number of 3.

At step 58, the number of rows bounded by the area is determined. The number of rows bounded by the area is determined by subtracting the lowest numbered row of the minimum rectangle from the highest numbered row of the minimum rectangle and adding 1.

With continuing reference to FIG. 3, step 58 leads to decisional step 60, where it is determined if the number of columns bounded by the area is greater than 16. The YES branch of decisional step 60 leads to step 62 where the area is partitioned into sub-areas each having 10 columns except for a last sub-area which has the remainder of the columns of the area. Thus, if the area has 25 columns, it is partitioned into two sub-areas having 10 columns each and a third sub-area having 5 columns.

Next, at decisional step 64, it is determined if the number of rows bounded by the area is less than 16. The NO branch of decisional step 64 leads to step 66 where the sub-areas, areas, partitioned at step 62, are further partitioned into formula boxes each having 10 rows except for a last formula box of each sub-area which has the remainder of the rows of the sub-area. Step 66 leads to step 68 where a shared formula is determined for each formula box. Each shared formula comprises the mathematical operations of the common formula in tokenized form along with the absolute cell references and the offsets of the relative cell references of the values on which the mathematical operations are performed. If the number of rows bounded by the area is less than 16, each sub-area forms a formula box and the YES branch of decisional step 64 leads to step 68 where a shared formula, as above described, is determined for each formula box.

Returning to decisional step 60, if the number of columns bounded by the area is not greater than 16, the NO branch leads to decisional step 70. At decisional step 70 it is determined if the number of columns bounded by the area is less than 5. If the number of columns bounded by the area is not less than 5, the NO branch of step 70 returns to decisional step 64, and the method proceeds as previously described. If the number of columns bounded by the area is less than 5 at step 70, the YES branch leads to decisional step 72. At decisional step 72, it is determined if the number of columns bounded by the area is equal to 1.

If the number of columns bounded by the area is not equal to 1, the NO branch of decisional step 72 leads to decisional step 74. At decisional step 74, it is determined if the number of rows bounded by the area is less than 32. If the number of rows bounded by the area is less than 32, the area forms a formula box and the YES branch leads to step 68 where a shared formula is determined for the formula box as previously described. Alternatively, if the number of rows bounded by the area is not less than 32, the NO branch leads to step 76. At step 76, the area is partitioned into formula boxes each having 20 rows except for a last formula box of the area which has the remainder of the rows of the area. Step 76 again leads to step 68 where a shared formula is determined for each formula box.

Returning to decisional step 72, if the number of columns bounded by the area is equal to 1, the YES branch leads to decisional step 78. At decisional step 78, it is determined if the number of rows bounded by the area is less than or equal to 48. If the number of rows bounded by the area is less than or equal to 48, the area forms a formula box, and the YES branch leads to step 68 where a shared formula is determined for the formula box as previously described. The NO branch of decisional step 78 leads to decisional step 80 where it is determined if the number of rows bounded by the area is greater than 200.

If the number of rows bounded by the area is greater than 200, the YES branch leads to step 82. At step 82 the area is partitioned into formula boxes each having 64 rows except for a last formula box of the area which has the remainder of the rows of the area. Step 82 leads to step 68 where a shared formula is determined for each formula box as previously described. If the number of rows bounded by the area is not greater than 200, the NO branch of decisional step 80 leads to step 84. At step 84 the area is partitioned into formula boxes each having 32 rows except for a last formula box of the area which has the remainder of the rows of the area. Step 84 leads to step 68 where a shared formula is determined for each formula box as previously described.

Step 68 leads to step 69 where the shared formula of each formula box is stored. Shared formulas are stored as was done in the prior art with the shared formula in tokenized form representing the mathematical operations to be performed. The absolute cell references of the values, on which the mathematical operations are performed and which values are identical for a common formula set, are stored along with the shared formula. However, because relative references are different for each formula in a common formula set, they cannot be stored directly in the shared formula. Instead, the offsets of the relative cell references are stored in the shared formula. The offsets of the relative cell references are identical for a common formula set.

Figure 4:
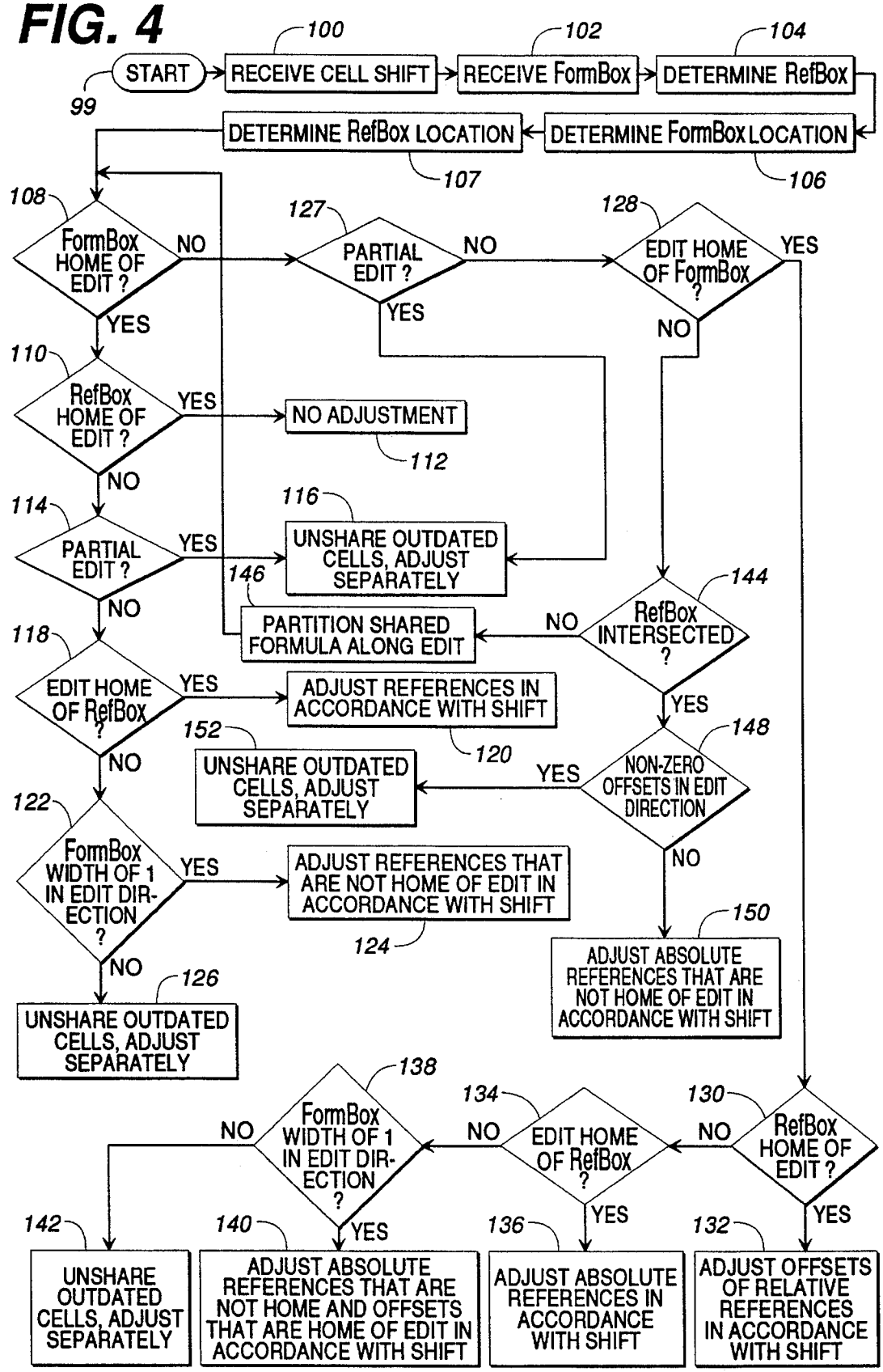
FIG. 4 is a logical flow diagram of the process for adjusting formulas in accordance with the present invention.

The method of the present invention for adjusting the formulas shared in the manner described above in response to editing operations is shown in FIG. 4. The adjusting method begins at step 99 and proceeds to step 100. At step 100 the spreadsheet program 22 receives a cell shift along an edit line 87 as shown in FIG. 5. At step 102, a formula box of a shared formula is received from the worksheet 24 for determining whether the shared formula needs to be adjusted, and if so, what adjustments are needed. As used herein the phrase formula box 89 means the boundaries of the formula box 89 which, as shown by FIG. 5, comprises of a top row 90, a bottom row 91, a left column 92 and a right column 93.

Proceeding to step 104, a reference box 94 (FIG. 5) bounding an area of the worksheet that contains the cell references of the shared formula is determined. The reference box 94 is determined from the shared formula in conjunction with the formula box 89, the method of which is later described in detail. Next, at step 106, the location of the formula box 89 (FIG. 5) is determined on the worksheet in regard to the location of the edit line 87 by comparing the location of the formula box 89 with the location of the edit line 87. Similarly, at step 107, the location of the reference box 94 is determined on the worksheet in regard to the location of the edit line 87 by comparing the location of the reference box 94 with the location of the edit line 87.

Step 107 leads to decisional step 108 wherein it is determined if the formula box is located home of the edit line 87. As used herein, the term home refers the cell A1 and the phrase home of means that the formula box 89 or the reference box 94 is closer to cell A1 than the edit line such that it is not shifted by the cell shift. In FIG. 5 for example, both the reference box 94 and the formula box 89 are home of the edit line 87.

Figure 6:
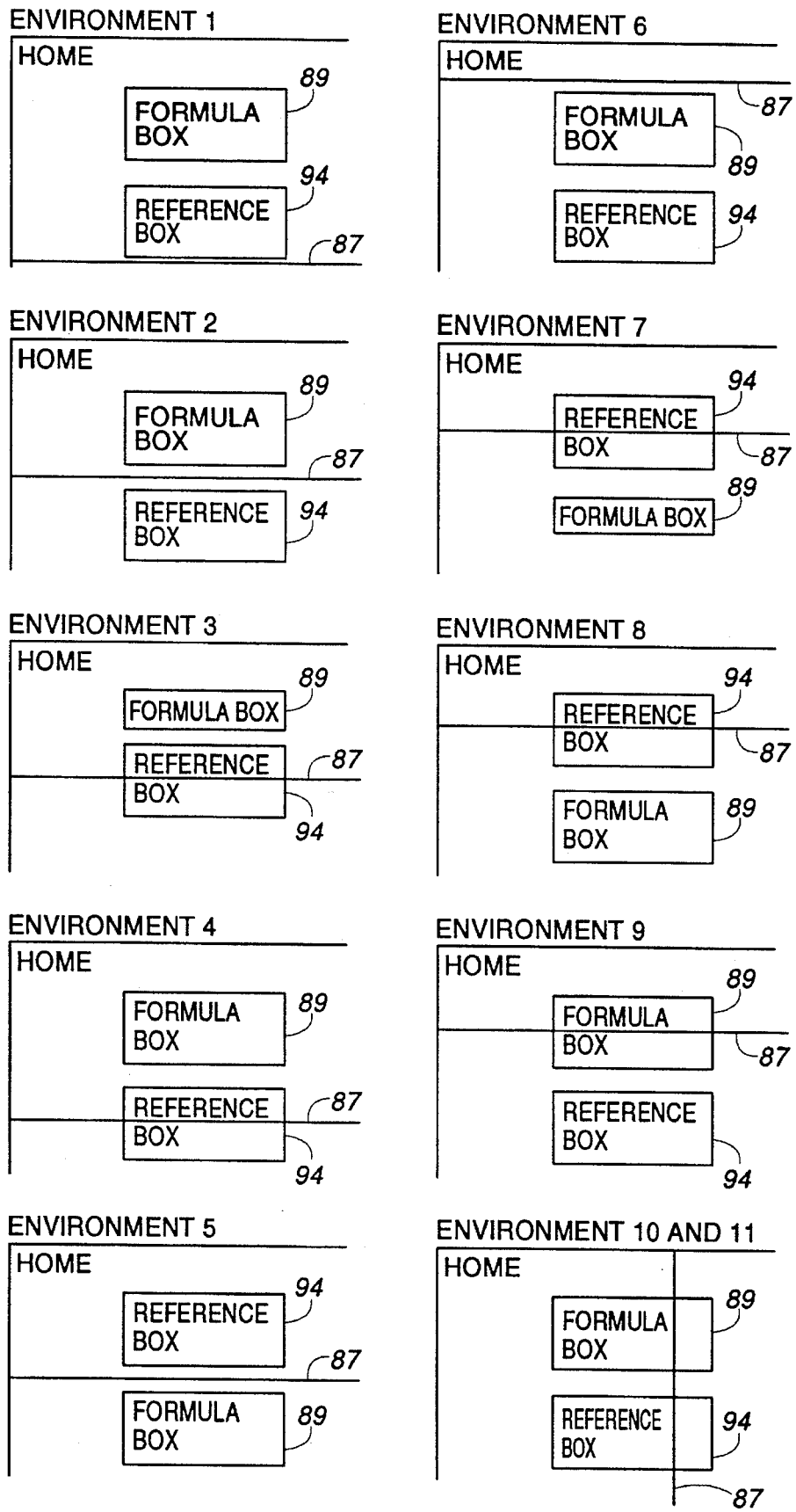
FIG. 6 is a diagrammatic view of the possible adjusting environments caused by an editing operation in the worksheet of FIG. 1, which adjusting environments show the formula box, the reference box and an edit line for adjusting shared formulas in accordance with the present invention.

If the formula box 89 is home of the edit line 87, the YES branch of decisional step 108 leads to decisional step 110. At decisional step 110 it is determined if the reference box 94 is located home of the edit line. If the reference box 94 is located home of the edit line, the formula box and the reference box are in the first adjusting environment (FIG. 6) and the YES branch leads to step 112 and no adjustments to the shared formula are necessary. The NO branch of decisional step 110 leads to decisional step 114 where it is determined if the cell shift along the edit line is a partial cell shift. A cell shift is a partial cell shift where only a block of cells, rather than an entire dimension (column or row), is shifted.

If the cell shift is a partial cell shift, the YES branch of decisional step 114 leads to step 11 6. At step 116, no adjustments are made to the shared formula but each cell of the shared formula is separately reviewed to determine if the shared formula is outdated for it, and if it is, the cell is unshared. The shared formula is outdated for a cell if an absolute reference or the offset of a relative reference of the cell has been shifted by the cell shift. A cell is unshared by re-storing the formula in the cell in place of the pointer to the shared formula. If the cell shift is not a partial cell shift, the NO branch leads to decisional step 118 where it is determined if the edit line is located home of the reference box 94 by comparing the location of the edit line 87 with the location of the reference box 94.

If the edit line is located home of the reference box 94, the formula box 89 and the reference box 94 are in the second adjusting environment (FIG. 6), and the YES branch of decisional step 118 leads to step 120. At step 120, the absolute cell references and the offsets of the relative cell references of the shared formula are adjusted in accordance with the cell shift. As used herein the phrase adjusted in accordance with the cell shift means to adjust a reference, whether it is an absolute cell reference or an offset of a relative cell reference, in the direction of the cell shift by the number of cells shifted along the edit line. Thus, if 2 rows are added, the number of cells shifted along the edit line is 2 and the row of the reference is increased by 2. For cell references that are area references, the top left cell of an area and the bottom right cell of the area, which cells define the area, are adjusted in accordance with the cell shift.

If the edit line 87 is not located home of the reference box 94 and the reference box 94 is intersected by the edit line (adjusting environment 3 and 4), the NO branch of decisional step 118 leads to decisional step 122. At decisional step 122, it is determined if the formula has a width a 1 cell in the direction of the cell shift. As used herein the phrase direction of the cell shift means a direction parallel to the cell shift. If the formula box is one cell wide in the direction of the cell shift, the formula box and the reference box are in the third adjusting environment (FIG. 6) and the YES branch of decisional step 122 leads to step 124. At step 124, the absolute cell references and the offsets of the relative cell references of the shared formula that are within the reference box 94 and that are not home of the edit line are adjusted in accordance with the cell shift (adjusting environment 3). If the formula box is not one cell wide in the direction of the cell shift, the formula box and the reference box are in the fourth adjusting environment (FIG. 6), and the NO branch of decisional step 122 leads to step 126. At step 126, no adjustments are made to the shared formula but each cell of the shared formula is separately reviewed to determine if the shared formula is outdated for it, and if it is, the cell is unshared.

Returning to decisional step 108, if the formula box is not home of the edit line, the NO branch leads to decisional step 127. At step 127, it is determined if the cell shift along the edit line is a partial cell shift. A cell shift is a partial cell shift where only a block of cells, rather than an entire dimension (column or row), is shifted. If the cell shift is a partial cell shift, the YES branch of decisional step 127 leads to step 116. At step 116, no adjustments are made to the shared formula but each cell of the shared formula is separately reviewed to determine if the shared formula is outdated for it, and if it is, the cell is unshared. The shared formula is outdated for a cell if an absolute reference or the offset of a relative reference of the cell has been shifted by the cell shift. A cell is unshared by re-storing the formula in the cell in place of the pointer to the shared formula.

If the cell shift is not a partial cell shift, the NO branch of decisional step 127 leads to decisional step 128 where it is determined if the edit line is home of the formula box. If the edit line is home of the formula box, the YES branch leads to decisional step 130. At decisional step 130 it is determined if the reference box 94 is home of the edit line. If, the reference box 94 is home of the edit line, the formula box and the reference box are in the fifth adjusting environment (FIG. 6) and the YES branch leads to step 132. At step 132, the offsets of the relative cell references of the shared formula are adjusted in accordance with the cell shift. If the reference box 94 is not home of the edit line, the NO branch of decisional step 130 leads to decisional step 134.

Proceeding to decisional step 134, it is determined if the edit line is home of the reference box 94 by comparing the location of the edit line 87 with the location of the reference box 94. If the edit line is home of the reference box 94, the formula box and the reference box are in the sixth adjusting environment (FIG. 6), and the YES branch leads to step 136. At step 136, the absolute cell references of the shared formula are adjusted in accordance with the cell shift. If the edit line is not home of the reference box 94, then the reference box 94 is intersected by the edit line and the NO branch of decisional step 134 leads to decisional step 138.

At decisional step 138, it is determined if the formula box is one cell wide in the direction of the cell shift by, depending on the direction of the cell shift, comparing the top row 90 with the bottom row 91 (row insert) or the left column 92 with the right column 93 (column insert). The formula box is one cell wide in the direction of the cell shift if, depending on the direction of the cell shift, the top row 90 and the bottom row 91 have the same row number (row insert) or if the left column 92 and the right column 93 have the same column number (column insert). If the formula box is one cell wide in the direction of the cell shift, the formula box and the reference box are in the seventh adjusting environment (FIG. 6), and the YES branch leads to step 140. At step 140, the offsets of the relative cell references of the shared formula that are home of the edit line and the absolute cell references of the shared formula that are not home of the edit line are adjusted in accordance with the cell shift. If the formula box is not one cell wide in the direction of the cell shift, the formula box and the reference box are in the eighth adjusting environment (FIG. 6), and the NO branch leads to step 142. At step 142, no adjustments are made to the shared formula, but each cell of the shared formula is separately reviewed to determine if the shared formula is outdated for it, and if it is, the cell is unshared.

Returning to decisional step 128, if the edit line is not home of the formula box, then the formula box is intersected by the edit line, and the NO branch leads to decisional step 144. At decisional step 144, it is determined if the reference box 94 is also intersected by the edit line 87 by comparing the location of the edit line 87 with the location of the reference box 94. If the reference box 94 is not intersected by the edit line, the formula box and the reference box are in the ninth adjusting environment (FIG. 6), and the NO branch leads to step 146. At step 146, the shared formula is partitioned along the edit line into a first shared formula that is home of the edit line and a second shared formula that is not home of the edit line. Step 146 returns to decisional step 108 where the first and the second shared formulas are separately processed. If the reference box 94 is also intersected by the edit line, the YES branch of decisional step 144 leads to decisional step 148.

At decisional step 148, it is determined if the offsets of the relative cell references of the shared formula are non-zero in the direction perpendicular to the direction of the cell shift. The offsets of the relative cell references of the shared formula are non-zero in the direction perpendicular to the direction of the cell shift if, depending on the direction of the cell shift, the relative references are in the same column as the cell containing the formula (column insert) or in the same row as the cell containing the formula (row insert). If the offsets of the relative cell references of the shared formula are zero in the direction perpendicular to the direction of the cell shift, the formula box and the reference box are in the tenth adjusting environment (FIG. 6), and the NO branch leads to step 150. At step 150, the absolute cell references of the shared formula that are not home of the edit line are adjusted in accordance with the cell shift. If the offsets of the relative cell references of the shared formula are non-zero in the direction perpendicular to the direction of the cell shift, the formula box and the reference box are in the eleventh adjusting environment (FIG. 6), and the YES branch leads to step 152. At step 152, no adjustments are made to the shared formula, but each cell of the shared formula is separately reviewed to determine if the shared formula is outdated for it, and if it is, the cell is unshared.

Cells which are unshared as a result of an editing operation may have a new common formula between them that can be shared. That new common formula of the cells will be shared by the spreadsheet program 22 when the worksheet 24 is next stored to memory.

Figure 7A:
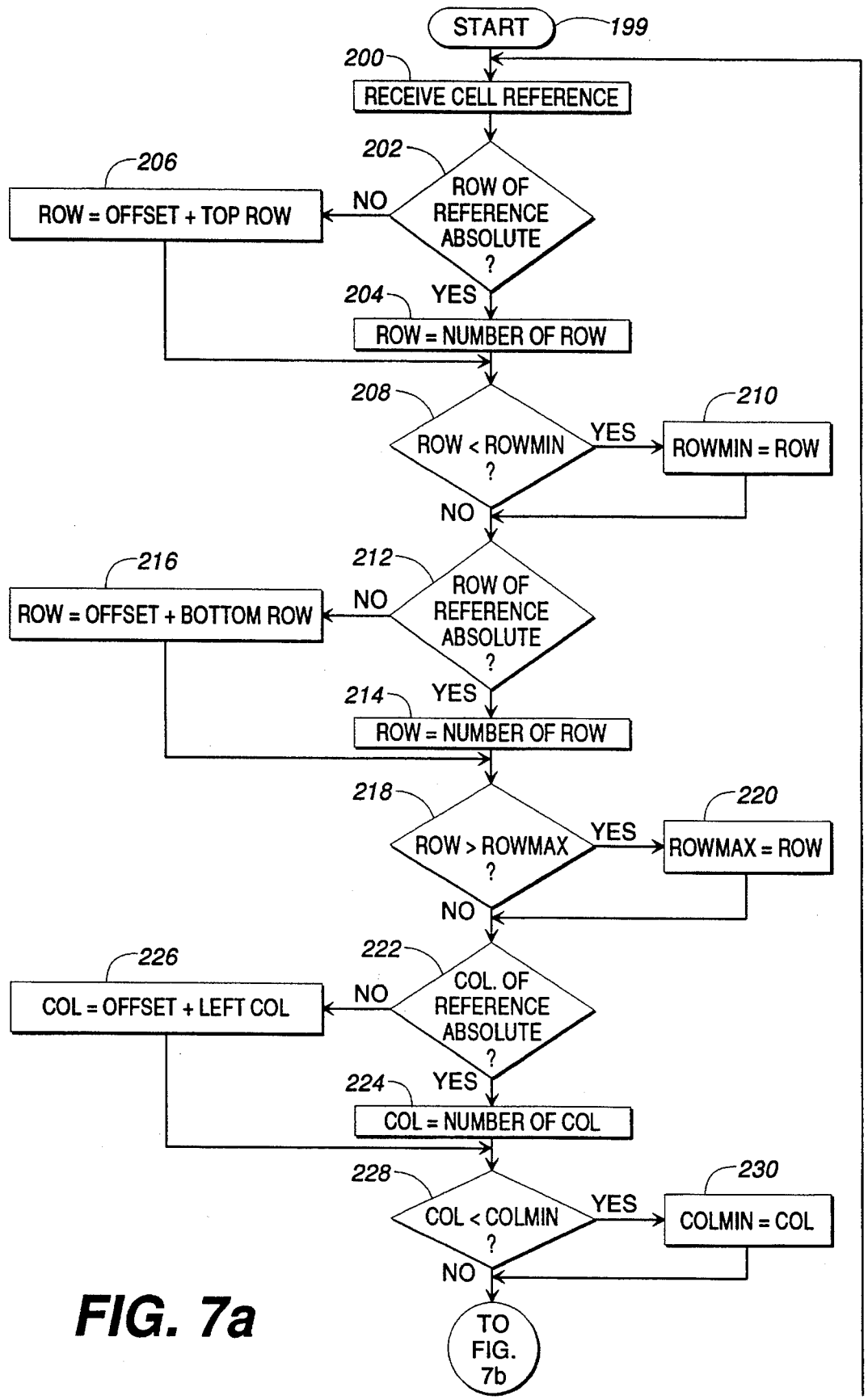
FIG. 7, which consists of FIGS. 7a and 7b, is a logical flow diagram of the process for determining the reference box in accordance with the present invention.
Figure 7B:
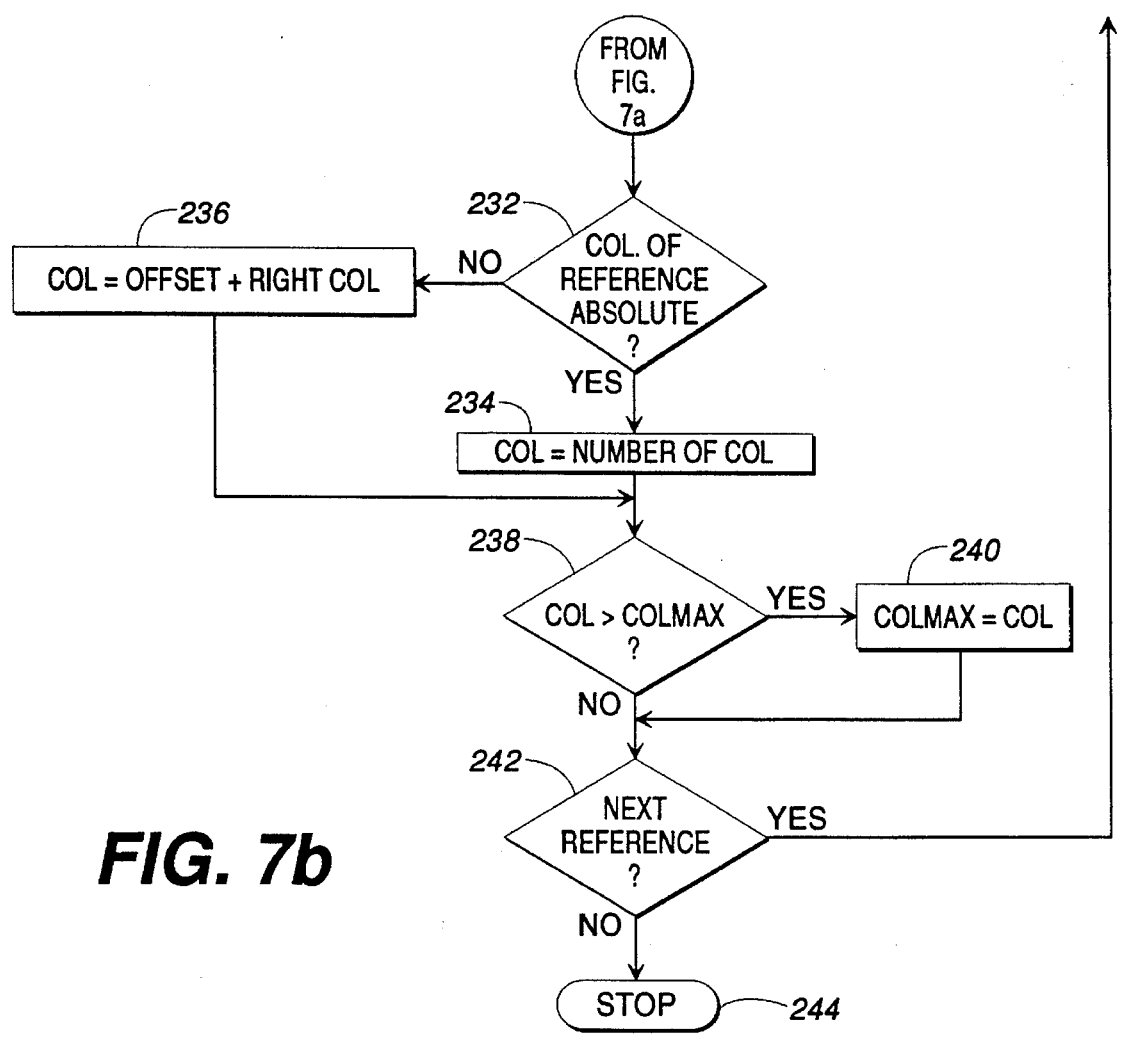

The method for determining the reference box 94 in accordance with the present invention is shown by FIGS. 7a and 7b. The reference box 94 is defined by a row minimum 95, a row maximum 96, a column minimum 97 and a column maximum 98 as shown in FIG. 5. The method begins at step 199 and proceeds to step 200. At step 200, the spreadsheet program 22 receives a cell reference of the shared formula. For cell references that are area references, the area references are each divided into their two references that define the area, that of the top left cell and that of the bottom right cell. The two references are then each processed as a separate cell reference.

Step 200 leads to decisional step 202, where it is determined if the row of the cell reference is an absolute reference by scanning the absolute reference bit which is on for absolute references. If the row of the cell reference is an absolute reference, the YES branch leads to step 204 where the number of the row becomes an intermediate row number. If the row of the cell reference is not an absolute reference, then the row of the cell reference is an offset of a relative reference, and the NO branch of decisional step 202 leads to step 206. At step 206, the offset is added to the number of the top row of the formula box to become the intermediate row number.

Proceeding to decisional step 208, it is determined if the intermediate row number is less than the row minimum by comparing the intermediate row number to the row minimum. If the intermediate row number is less than the row minimum, the YES branch leads to step 210 where the intermediate row number is stored as the row minimum. The NO branch of decisional step 208 and step 210 lead to decisional step 212.

At decisional step 212, it is determined if the row of the cell reference is an absolute reference by scanning the absolute reference bit which is on for absolute references. If the row of the cell reference is an absolute reference, the YES branch leads to step 214 where the number of the row becomes an intermediate row number. If the row of the cell reference is not an absolute reference, then the row of the cell reference is an offset of a relative reference, and the NO branch of decisional step 212 leads to step 216. At step 216, the offset is added to the number of the bottom row of the formula box to become the intermediate row number.

Proceeding to decisional step 218, it is determined if the intermediate row number is greater than the row maximum by comparing the intermediate row number to the row maximum. If the intermediate row number is greater than the row maximum, the YES branch leads to step 220 where the intermediate row number is stored as the row maximum. The NO branch of decisional step 218 and step 220 both lead to decisional step 222.

At decisional step 222, it is determined if the column of the cell reference is an absolute reference by scanning the absolute reference bit which is on for absolute references. If the column of the cell reference is an absolute reference, the YES branch leads to step 224 where the number of the column becomes an intermediate column number. If the column of the cell reference is not an absolute reference, then the column of the cell reference is an offset of a relative reference, and the NO branch of decisional step 222 leads to step 226. At step 226, the offset is added to the number of the left column of the formula box to become the intermediate column number.

Proceeding to decisional step 228, it is determined if the intermediate column number is less than the column minimum by comparing the intermediate column number to the column minimum. If the intermediate column number is less than the column minimum, the YES branch leads to step 230 where the intermediate column number is stored as the column minimum. The NO branch of decisional step 228 and step 230 both lead to decisional step 232.

At decisional step 232, it is determined if the column of the cell reference is an absolute reference by scanning the absolute reference bit which is on for absolute references. If the column of the cell reference is an absolute reference, the YES branch leads to step 234 where the number of the column becomes an intermediate column number. If the column of the cell reference is not an absolute reference, then the column of the cell reference is an offset of a relative reference, and the NO branch of decisional step 232 leads to step 236. At step 236, the offset is added to the number of the right column of the formula box to become the intermediate column number.

Proceeding to decisional step 238, it is determined if the intermediate column number is greater than the column maximum by comparing the intermediate column number to the column maximum. If the intermediate column number is greater than the column maximum, the YES branch leads to step 240 where the intermediate column number is stored as the column maximum. The NO branch of decisional step 238 and step 240 both lead to decisional step 242.

At decisional step 242, it is determined if a next reference exists by scanning the shared formula for a next reference. If a next reference exists, the next reference becomes the reference, and the YES branch returns to step 200 where the cell reference is received. If a next reference does not exists, the reference box 94 is determined.

As described above, the present invention partitions large cell groups having common formulas into smaller formula boxes. A separate shared formula is then shared for each formula box. Because the shared formulas are shared only by the cells of smaller, generally square formula boxes instead of by large and rectangular cell groups, the cells of a shared formula are less likely to be intersected by an edit line. Therefore, the shared formulas may be more efficiently adjusted in response to editing operations.

Upon an editing operation, the boundary line of cells that are shifted is determined with respect to the location of the formula box of a shared formula and to the location of the cell references in the shared formula. The absolute cell references and the offsets of the relative cell references of the shared formulas are then adjusted on the basis of the relative location of the boundary line. Further, a cell which can no longer share the shared formula due to the cell shift are unshared.

From the foregoing description of the preferred embodiments and the several alternatives, other alternative constructions of the present invention may suggest themselves to those skilled in the art. Therefore, the scope of the present invention is to be limited only by the claims below and equivalents thereof.

I claim:

1. A method in a spreadsheet program of sharing common formulas of a cell group in a worksheet, the method comprising the steps of:

(a) determining an area of a minimum rectangle that contains the cell group;

(b) determining the number of columns bounded by the area;

(c) determining the number of rows bounded by the area;

(d) determining if the number of columns bounded by the area is greater than N, N being an integer:

(1) if the number of columns bounded by the area is greater than N;

(A) partitioning the area into sub-areas each having X columns except for a last sub-area which has the remainder of the columns of the area, X being an integer not greater than N;

(B) determining if the number of rows bounded by the area is greater than M, M being an integer:

(1) if the number of rows bounded by the area is greater than M, partitioning the sub-areas into formula boxes each having Y rows except for a last formula box of each sub-area which has the remainder of the rows of the sub-area, Y being an integer not greater than M; or (2) if the number of rows bounded by the area is not greater than M, each sub-area forming a formula box;

(2) if the number of columns bounded by the area is not greater than N, determining if the number of rows bounded by the area is greater than M, M being an integer:

(A) if the number of rows bounded by the area is greater than M, partitioning the area into formula boxes each having Y rows except for a last formula box of the area which has the remainder of the rows of the area, Y being an integer not greater than M; or (B) if the number of rows bounded by the area is not greater than M, the area forming a formula box;

(e) determining a shared formula for each formula box; and (f) storing the shared formula of each formula box.

2. A method in a spreadsheet program of sharing common formulas of a cell group in a worksheet as recited in claim 1, wherein N is an integer between, and including 5 and 20.

3. A method in a spreadsheet program of sharing common formulas of a cell group in a worksheet as recited in claim 1, wherein X is an integer between, and including 5 and 20.

4. A method in a spreadsheet program of sharing common formulas of a cell group in a worksheet as recited in claim 1, wherein M is an integer between, and including 5 and 20.

5. A method in a spreadsheet program of sharing common formulas of a cell group in a worksheet as recited in claim 1, wherein Y is an integer between, and including 5 and 20.

6. A method in a spreadsheet program of sharing common formulas of a cell group in a worksheet as recited in claim 1, wherein N is an integer between, and including 10 and 16.

7. A method in a spreadsheet program of sharing common formulas of a cell group in a worksheet as recited in claim 1, wherein X is 10.

8. A method in a spreadsheet program of sharing common formulas of a cell group in a worksheet as recited in claim 1, wherein M is an integer between, and including 10 and 16.

9. A method in a spreadsheet program of sharing common formulas of a cell group in a worksheet as recited in claim 1, wherein Y is 10.

10. A method in a spreadsheet program of sharing common formulas of a cell group in a worksheet, the method comprising the steps of:
    (a) determining an area of a minimum rectangle that contains the cell group;
    (b) determining the number of columns bounded by the area;
    (c) determining the number of rows bounded by the area;
    (d) determining if the number of columns bounded by the area is greater than 16:
        (1) if the number of columns bounded by the area is greater than 16;
            (A) partitioning the area into sub-areas each having 10 columns except for a last sub-area which has the remainder of the columns of the area; and
            (B) determining if the number of rows bounded by the area is less than 16:
                (1) if the number of rows bounded by the area is not less than 16, partitioning the sub-areas into formula boxes each having 10 rows except for a last formula box of each sub-area which has the remainder of the rows of the sub-area; or
                (2) if the number of rows bounded by the area is less than 16, each sub-area forming a formula box; or
        (2) if the number of columns bounded by the area is not greater than 16, determining if the number of columns bounded by the area is less than 5:
            (A) if the number of columns bounded by the area is not less than 5, determining if the number of rows bounded by the area is less than 16:
                (1) if the number of rows bounded by the area is not less than 16, partitioning the area into formula boxes each having 10 rows except for a last formula box of the area which has the remainder of the rows of the area; or
                (2) if the number of rows bounded by the area is less than 16, the area forming a formula box; or
            (B) if the number of columns bounded by the area is less than 5, determining if the number of columns bounded by the area is equal to 1:
                (1) if the number of columns bounded by the area is not equal to 1, determining if the number of rows bounded by the area is less than 32:
                    (A) if the number of rows bounded by the area is less than 32, the area forming a formula box; or
                    (B) if the number of rows bounded by the area is not less than 32, partitioning the area into formula boxes each having 20 rows except for a last formula box of the area which has the remainder of the rows of the area; or
                (2) if the number of columns bounded by the area is equal to 1, determining if the number of rows bounded by the area is less than or equal to 48:
                    (A) if the number of rows bounded by the area is less than or equal to 48, the area forming a formula box; or
                    (B) if the number of rows bounded by the area is not less than or equal to 48, determining if the number of rows bounded by the area is greater than 200:
                        (1) if the number of rows bounded by the area is greater than 200, partitioning the area into formula boxes each having 64 rows except for a last formula box of the area which has the remainder of the rows of the area; or
                        (2) if the number of rows bounded by the area is not greater than 200, partitioning the area into formula boxes each having 32 rows except for a last formula box of the area which has the remainder of the rows of the area;
    (e) determining a shared formula for each formula box; and
    (f) storing the shared formula of each formula box.

11. A method in a spreadsheet program of adjusting a shared formula which is shared by a cell group in a worksheet, the method comprising the steps of:
    (a) receiving a cell shift along an edit line;
    (b) receiving a formula box, the formula box bounding an area of the worksheet that contains the cell group;
    (c) determining a reference box, the reference box bounding an area of the worksheet that contains the cell references of the shared formula;
    (d) determining the location of the formula box on the worksheet in regard to the location of the edit line;
    (e) determining the location of the reference box on the worksheet in regard to the location of the edit line;
    (f) if the formula box and the reference box are located home of the edit line, making no adjustments to the shared formula;
    (g) if the formula box is located home of the edit line but the edit line is located home of the reference box, adjusting the absolute cell references and the offsets of the relative cell references of the shared formula in accordance with the cell shift;
    (h) if the formula box is located home of the edit line but the reference box is intersected by the edit line, making no adjustments to the shared formula but unsharing the cells of the cell group for which the shared formula is outdated;
    (i) if the reference box is located home of the edit line but the edit line is located home of the formula box, adjusting the offsets of the relative cell references of the shared formula in accordance with the cell shift;
    (j) if the edit line is located home of the formula box and the reference box, adjusting the absolute cell references of the shared formula in accordance with the cell shift;
    (k) if the edit line is located home of the formula box but the reference box is intersected by the edit line, making no adjustments to the shared formula but unsharing the cells of the cell group for which the shared formula is outdated;
    (l) if the formula box is intersected by the edit line but the reference box is not intersected by the edit line, partitioning the shared formula along the edit line into a first shared formula that is home of the edit line and a second shared formula that is not home of the edit line, returning separately to step (b) for the first shared formula and for the second shared formula; and
    (m) if the formula box and the reference box are intersected by the edit line, making no adjustments to the shared formula but unsharing the cells of the cell group for which the shared formula is outdated.

12. A method in a spreadsheet program of adjusting a shared formula which is shared by a cell group in a worksheet as recited in claim 11, wherein if the formula box is located home of the edit line but the reference box is intersected by the edit line as recited in step (h), the method further comprising the steps of:

(h) (1) determining if the formula box is one cell wide in the direction of the cell shift; and (2) if the formula box is one cell wide in the direction of the cell shift, adjusting the absolute cell references and the offsets of the relative cell references of the shared formula that are not home of the edit line in accordance with the cell shift.

13. A method in a spreadsheet program of adjusting a shared formula which is shared by a cell group in a worksheet as recited in claim 11, wherein if the edit line is located home of the formula box but the reference box is intersected by the edit line as recited in step (k), the method further comprising the steps of:

(k) (1) determining if the formula box is one cell wide in the direction of the cell shift; and (2) if the formula box is one cell wide in the direction of the cell shift, adjusting the offsets of the relative cell references of the shared formula that are home of the edit line and the absolute cell references of the shared formula that are not home of the edit line in accordance with the cell shift.

14. A method in a spreadsheet program of adjusting a shared formula which is shared by a cell group in a worksheet as recited in claim 11, wherein if the formula box and the reference box are intersected by the edit line as recited in step (m), the method further comprising the steps of:

(m) (1) determining if the offsets of the relative cell references of the shared formula are non-zero in the direction perpendicular to the cell shift; and (2) if the offsets of the relative cell references of the shared formula are non-zero in the direction perpendicular to the cell shift, adjusting the absolute cell references of the shared formula that are not home of the edit line in accordance with the cell shift.

15. A method in a spreadsheet program of adjusting a shared formula which is shared by a cell group in a worksheet as recited in claim 11, wherein the step of making no adjustments to the shared formula as a result of the formula box and the reference box being located home of the edit line as recited in step (f) is follow by the steps of:

(n) determining if the cell shift along the edit line is a partial cell shift; and (o) if the cell shift along the edit line is a partial cell shift, making no adjustments to the shared formula but unsharing the cells of the cell group for which the shared formula is outdated.

16. A method in a spreadsheet program of adjusting a shared formula which is shared by a cell group in a worksheet as recited in claim 11, wherein the area bounded by the formula box comprises the minimum rectangle that contains the cell group.

17. A method in a spreadsheet program of adjusting a shared formula which is shared by a cell group in a worksheet as recited in claim 11, wherein the area bounded by the reference box comprises the minimum rectangle that contains the cell references of the shared formula.

18. A method in a spreadsheet program of adjusting a shared formula which is shared by a cell group in a worksheet as recited in claim 11, wherein the area bounded by the formula box comprises the minimum rectangle that contains the cell group and the formula box is defined by a top row, a bottom row, a left column and a right column of the minimum rectangle, and wherein the reference box is defined by a row minimum, a row maximum, a column minimum and a column maximum that are determined by the steps of:

(c) (1) receiving a cell reference of the shared formula, the cell reference having a row and a column;

(2) determining if the row of the cell reference is an absolute reference:

(A) if the row of the cell reference is an absolute reference, the number of the row becoming an intermediate row number; or (B) if the row of the cell reference is not an absolute reference, then the row of the cell reference is an offset of a relative reference and the offset added to the number of the top row of the formula box becoming an intermediate row number;

(3) determining if the intermediate row number is less than the row minimum:

(A) if the intermediate row number is less than the row minimum, storing the intermediate row number as the row minimum; or (B) if the intermediate row number is not less than the row minimum, continuing to step (c)(4);

(4) determining if the row of the cell reference is an absolute reference:

(A) if the row of the cell reference is an absolute reference, the number of the row becoming an intermediate row number; or (B) if the row of the cell reference is not an absolute reference, then the row of the cell reference is an offset of a relative reference and the offset added to the number of the bottom row of the formula box becoming an intermediate row number;

(5) determining if the intermediate row number is greater than the row maximum:

(A) if the intermediate row number is greater than the row maximum, storing the intermediate row number as the row maximum; or (B) if the intermediate row number is not greater than the row maximum, continuing to step (c)(6);

(6) determining if the column of the cell reference is an absolute reference:

(A) if the column of the cell reference is an absolute reference, the number of the column becoming an intermediate column number; or (B) if the column of the cell reference is not an absolute reference, then the column of the cell reference is an offset of a relative reference and the offset added to the number of the left column of the formula box becoming an intermediate column number;

(7) determining if the intermediate column number is less than the column minimum:

(A) if the intermediate column number is less than the column minimum, storing the intermediate column number as the column minimum; or (B) if the intermediate column number is not less than the column minimum, continuing to step (c)(8);

(8) determining if the column of the cell reference is an absolute reference:

(A) if the column of the cell reference is an absolute reference, the number of the column becoming an intermediate column number; or (B) if the column of the cell reference is not an absolute reference, then the column of the cell reference is an offset of a relative reference and the offset added to the number of the right column of the formula box becoming an intermediate column number;

(9) determining if the intermediate column number is greater than the column maximum:
(A) if the intermediate column number is greater than the column maximum, storing the intermediate column number as the column maximum; or
(B) if the intermediate column number is not greater than the column maximum, continuing to step (c)(10); and

(10) determining if a next reference exists:
(A) if a next reference exists, the next reference becoming the reference, and returning to step (c)(1); or
(B) if a next reference does not exist, ending the reference box determination method.

19. A system for implementing a spreadsheet for adjusting a shared formula which is shared by a cell group in a worksheet comprising:

(a) a formula box, the formula box bounding an area of the worksheet that contains the cell group;

(b) a reference box, the reference box bounding an area of the worksheet that contains the cell references of the shared formula;

(c) an edit line along a cell shift;

(d) means for determining the location of the formula box and the reference box on the worksheet in regard to the location of the edit line;

(e) means for determining a shared formula adjustment to the shared formula on the basis of the location of the formula box and the reference box on the worksheet in regard to the location of the edit line; and (f) means for executing the shared formula adjustment to the shared formula.

20. A system for implementing a spreadsheet for adjusting a shared formula which is shared by a cell group in a worksheet as recited in claim 19, wherein the area bounded by the formula box comprises the minimum rectangle that contains the cell group.

21. A system for implementing a spreadsheet for adjusting a shared formula which is shared by a cell group in a worksheet as recited in claim 19, wherein the area bounded by the reference box comprises the minimum rectangle that contains the cell references of the shared formula.

* * * * *